United States Patent Office 3,210,424
Patented Oct. 5, 1965

3,210,424
4-AMINO-5-PHENYL-1-PENTENE
Dominic Donald Micucci, Havertown, Pa., assignor to Richardson-Merrell Inc., New York, N.Y., a corporation of Delaware
No Drawing. Filed Apr. 19, 1963, Ser. No. 274,348
2 Claims. (Cl. 260—570.8)

This invention relates to amphetamine derivatives having new and valuable combinations of pharmacological properties. In a particular aspect, this invention relates to 4-amino-5-phenyl-1-pentene and its acid addition salts, and to a method for their preparation.

The prepartion of 4-amino-5-phenyl-1-pentene is conveniently accomplished by treatment of alpha-allyl-beta-phenylpropionamide[1] with bromine or chlorine and alkali under Hofmann rearrangement conditions:[2]

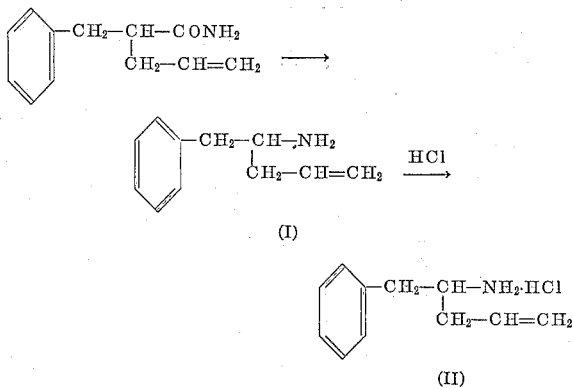

In contrast to amphetamine and other related drugs, 4-amino-5-phenyl-1-pentene has oral analgesic activity in rats and mice at dose levels considerably below those producing overt side effects. This compound also exhibits hypotensive activity, and anticonvulsant and anorexic activities at doses producing little or no symptomatology. Anti-inflammatory activity was evident at higher doses. The Straub Tail test, together with other pharmacology, suggests that 4-amino-5-phenyl-1-pentene is not opiate-like. 4-amino-5-phenyl-1-pentene is a promising non-narcotic analgesic agent.

Oral analgesic doses ($ED_{50}$) in mice produced no overt symptomatology. Xylopropamine and d-amphetamine produced analgesia only at doses at or near those showing definite CNS stimulation. The compound is also effective in lowering blood pressure in anesthetized normotensive dogs.

A summary of some of the biological testing of 4-amino-5-phenyl-1-pentene is contained in Tables I and II.

[1] Micucci, D. D., Avakian, S., Dietrich, E., Beiler, J. M., and Martin, G. J., Exptl. Med. Surg. 11, 185 (1953).
[2] Hofmann, A. W., Ber. 15, 407, 762 (1882).

EXAMPLE

One hundred and twenty-five milliliters of bromine was added to a solution of 360 grams of sodium hydroxide in 3 liters of water and cooled to a temperature of 0° C. To this mixture was added alpha-allyl-beta-phenyl-propionamide (285 grams, 1.5 mole). After stirring for one hour at 0° C., the mixture was allowed to warm to room temperature. With occasional cooling, the temperature was maintained at room level and the stirring was continued for an additional one and a half hours.

The product mixture was extracted with diethyl ether, the extract was washed with 5 percent hydrochloric acid solution, and the diethyl ether fraction was discarded. The aqueous hydrochloric acid solution was washed with diethyl ether, then the aqueous product solution was acidified and extracted with diethyl ether. The ether extract was dried and fractionally distilled in vacuo. 4-amino-5-phenyl-1-pentene was recovered as a distillate fraction, $n_D^{27}=1.5215$.

A portion of the 4-amino-5-phenyl-1-pentene was converted to the hydrochloride salt in the usual manner. The salt was recrystallized from ethanol-diethyl ether, melting point 150° C. to 160° C. Elemental analysis was in accord with the designated structure.

4-amino-5-phenyl-1-pentene may be administered orally or by injection. The following are illustrative of pharmaceutical dosage forms suitable for administration of the compound:

(a) Fifty (50) grams of 4-amino-5-phenyl-1-pentene hydrochloride is mixed intimately with 25 grams of corn starch and 175 grams of lactose. The mixed powders of granulated with 10 percent starch paste and forced through a 12-mesh stainless steel screen. The granulation is dried thoroughly at a temperature not exceeding 40° C. and then forced through a 16-mesh stainless steel screen. Five (5) grams of talc and 2.5 grams of magnesium stearate are added and mixed by tumbling with the granulation. The granulation is then compressed into 1,000 tablets, each containing 50 milligrams of the active compound.

(b) Fifty (50) grams of 4-amino-5-phenyl-1-pentene hydrochloride is mixed intimately with 250 grams of lactose and 1.5 grams of calcium stearate. The mixture is forced through a 40-mesh stainless steel screen, and is then filled into 1,000 gelatin capsules, each containing 50 milligrams of the active compound.

(c) Ten (10) grams of 4-amino-5-phenyl-1-pentene hydrochloride, 0.9 gram of methylparaben, 0.1 gram of propylparaben, and 5 grams of sodium chloride are dissolved in 900 milliliters of water for injection and brought to a volume of 1 liter with water for injection. The solution is filtered through hardened filter paper, and is then sterilized by filtration through Selas candle. The solution is then filled, under aseptic conditions, into sterile 5-milliliter ampul vials. The vials are capped with sterile rubber closures and sealed with aluminum seals. The final concentration of active compound in the solution is 10 milligrams per milliliter.

Table 1

| | Dose Range (mice) | Acute Toxicity (mice) | Anticonvulsant (mice) | Analgesia (mice) | Antiinflammatory (rats) | Hypotensive (dogs) |
|---|---|---|---|---|---|---|
| 4-amino-5-phenyl-1-pentene·HCl | No overt symptoms below 100 mg./kg. orally; at higher doses symptom profile consists of CNS stimulation. | $LD_{50}$[1] P.O.[2] 260 mg./kg. | $ED_{50}$ P.O.[3] 84 mg./kg. | $ED_{50}$ P.O. 25 mg./kg. | Active at 125 mg./kg. | Active hypotensive. |

[1] Dose producing death in 50 percent of animals tested.
[2] Per oral route of administration.
[3] Dose exerting pharmacological effect on 50 percent of animals tested.

Table II

| | Mouse LD$_{50}$ (mg./kg.) orally | Mouse LD$_{50}$ (mg./kg.) I.V. | Analgesic Activity | | | |
|---|---|---|---|---|---|---|
| | | | Mouse Hot Plate [1] ED$_{100}$ (mg./kg.) orally | Mouse Writhing ED$_{50}$ (mg./kg.) orally | Mouse Tail Clamp ED$_{50}$ (mg./kg.) I.V. | Randall Sellito ED$_{50}$ (mg./kg.) orally |
| 4-amino-5-phenyl-1-pentene·HCl. | 260 (208-325) | 30 (24-38) | 40-82 | 28 (19-40) | 13 (8.1-20.8) | 140 |
| d-Amphetamine sulfate | 33 (21-52) | 10 (8-11) | | 14.5 | 2.6 (0.9-5.7) | 4.1 (2.7-6.0) |
| Xylopropamine hydrochloride. | 220 (154-300) | 23 (17-30) | | 16 | 26 (20-32) | 0.6 (0.15-2.4) |
| d-Propoxyphene hydrochloride. | 255 (200-325) | 25 (22-28) | | 59 | 21 (15-32) | 4.7 (3.4-6.4) | 48 |
| Codeine phosphate | Approx. 400 | 86 (67-111) | | 17 | 6.8 (4.6-10.1) | 6.5 (3.9-10.7) | 98 |
| Acetylsalicylic acid | Approx. 2,000 | 700 (560-875) | Inactive | | 138 (100-190) | ($^2$) | 270 |

[1] Minimum dose producing pharmacological effect in 100 percent of animals tested.
[2] Na Salicylate active only in toxic dose range.

What is claimed is:
1. Compounds of the group consisting of 4-amino-5-phenyl-1-pentene and the acid addition salts thereof.
2. 4-amino-5-phenyl-1-pentene hydrochloride.

References Cited by the Examiner
UNITED STATES PATENTS

| 2,874,188 | 2/59 | Micucci et al. | 260—558 |
| 3,050,559 | 8/62 | Burger | 260—570.5 |
| 3,052,721 | 9/62 | Bernstein et al. | 260—570.5 X |
| 3,068,283 | 12/62 | Kaiser et al. | 260—570.5 X |
| 3,106,576 | 10/63 | Kaiser et al. | 260—558 X |

OTHER REFERENCES

Houben-Weyl: "Methoden der Organischen Chemie," volume XI/1, pages 859 (1957).

CHARLES B. PARKER, *Primary Examiner.*

IRVING MARCUS, *Examiner.*